(12) United States Patent
Otani et al.

(10) Patent No.: US 7,662,490 B2
(45) Date of Patent: Feb. 16, 2010

(54) NEAR-INFRARED SHIELD AND DISPLAY FRONT PLATE

(75) Inventors: Noriaki Otani, Ibaraki (JP); Yuji Yamashita, Ibaraki (JP); Teruhisa Miyata, Ibaraki (JP); Tetsuya Taki, Ibaraki (JP)

(73) Assignee: Hitachi Maxell, Ltd, Ibaraki-shi, Osaka (JP)

( * ) Notice: Subject to any disclaimer, the term of this patent is extended or adjusted under 35 U.S.C. 154(b) by 370 days.

(21) Appl. No.: 11/280,344

(22) Filed: Nov. 17, 2005

(65) Prior Publication Data
US 2006/0105175 A1    May 18, 2006

(30) Foreign Application Priority Data

Nov. 18, 2004    (JP) .............................. 2004-334904
Oct. 5, 2005    (JP) .............................. 2005-292688

(51) Int. Cl.
*B32B 9/00*    (2006.01)
*G03C 1/735*    (2006.01)

(52) U.S. Cl. ...................... 428/702; 428/688; 428/690; 430/269; 430/270.1

(58) Field of Classification Search ................ 428/323, 428/428, 432, 697, 702, 688, 690; 252/587; 548/427; 359/885; 430/269, 270.1
See application file for complete search history.

(56) References Cited

U.S. PATENT DOCUMENTS 6,210,787 B1 *    4/2001    Goto et al. ............... 428/301.4
6,387,481 B1 *    5/2002    Matsuzaki et al. .......... 428/323
6,548,177 B2 *    4/2003    Hieda et al. ................. 428/441

(Continued)

FOREIGN PATENT DOCUMENTS

JP    11-316309 A    11/1999

(Continued)

OTHER PUBLICATIONS

Hanaoka et al., "Characteristics of an antireflection film and optimum design/film . . . ", 1$^{st}$ Ed., second printing at Technical Information Institute Co., Ltd., Feb. 5, 2002, p. 184 with its partial translation.

(Continued)

*Primary Examiner*—Timothy M Speer
*Assistant Examiner*—Lauren Robinson
(74) *Attorney, Agent, or Firm*—Birch, Stewart, Kolasch & Birch, LLP (57) ABSTRACT

A near-infrared shield according to the present invention includes a base and a near-infrared absorption layer disposed on one main surface of the base. When the near-infrared shield is irradiated from the near-infrared absorption layer side with xenon light having a wavelength of 380 nm to 1200 nm at an illuminance of 60 W/m$^2$ (an energy density in a range of 300 nm to 400 nm) for 16 hours under a condition of BPT of 63° C. and a relative humidity of 50%, chromaticity changes $\Delta x$, $\Delta y$ of transmitted light, which are shown in a chromaticity diagram of a CIE1931XYZ color system, are 0.005 or less respectively. The near-infrared shield has an excellent near-infrared shielding property and an excellent light resistance, and its near-infrared absorptivity does not deteriorate even after long-term storage.

10 Claims, 5 Drawing Sheets

U.S. PATENT DOCUMENTS

2004/0137367 A1* 7/2004 Kitayama et al. ...... 430/270.19
2005/0040378 A1* 2/2005 Kobayashi et al. .......... 252/587
2005/0148786 A1* 7/2005 Ikeda et al. ................. 552/301
2006/0073407 A1 4/2006 Yamanobe et al.

FOREIGN PATENT DOCUMENTS

| JP | 02-091043 | * 11/2002 |
| JP | 2003-21715 A | 1/2003 |
| JP | 2003-327865 A | 11/2003 |
| JP | 2004-285314 A | 10/2004 |
| WO | WO-02-091043 | * 11/2002 |
| WO | WO-03/005076 A1 | 1/2003 |
| WO | WO-2004/048480 A1 | 6/2004 |

OTHER PUBLICATIONS

English Language Translation of Japan, publication No. 2004-285314-A, publication dated Oct. 14, 2004.

English Language Translation of Japan, publication No. 2003-327865-A, publication dated Nov. 19, 2003.

* cited by examiner

NEAR-INFRARED SHIELD AND DISPLAY FRONT PLATE

BACKGROUND OF THE INVENTION

1. Field of the Invention

The present invention relates to a near-infrared shield and a display front plate using the near-infrared shield.

2. Description of Related Art

Recently, demands for plasma display panels (PDPs) as display panels for various electronic equipment like large-sized TVs have been increased. A PDP includes two glass plates on which a fluorescent substance is applied, and a gap between the glass plates is filled with a gaseous mixture containing xenon and neon. When a high voltage is applied to the gaseous mixture, ultraviolet radiation is generated. The ultraviolet radiation impinges the fluorescent substance, and thus the fluorescent substance emits light.

At this time however, in addition to the ultraviolet radiation, near-infrared radiation in a wavelength region ranging from 820 nm to 1100 nm, electromagnetic waves and the like are generated as well. Since the near-infrared radiation has a wavelength region overlapping the wavelength region used for near-infrared communications or remote controls of the other electronic equipment, it can cause malfunctions of the equipment. For solving the problem, a near-infrared shield is provided on the front plate of the PDP so as to absorb the near-infrared radiation (see "Characteristics of an antireflection film and optimum design/film formation technology" by Hanaoka et al., first edition, second printing at Technical Information Institute Co., Ltd., Feb. 5, 2002, p. 184).

For the near-infrared shield, for example, a product prepared by dispersing a near-infrared absorption compound in a resin and shaping it into a film is known. Examples of the near-infrared absorption compound include a diimonium compound, a phthalocyanine compound, a cyanine compound and the like. The compounds are known for exhibiting a particularly excellent near-infrared absorption characteristic in a case where two or more of the compounds are used in combination, particularly in a case of combining the diimonium compound and either the phthalocyanine compound or the cyanine compound in comparison with a case of using one of the compounds alone (see JP 11(1999)-316309 A and JP2003-21715 A).

In general however, conventionally-used phthalocyanine compounds do not have the desired solubility in solvents or compatibility with resin. Therefore, various substituents must be introduced when such a compound is used for a near-infrared shield, and this increases the production cost. The conventionally-used cyanine compound is easy to obtain. However, when it is combined in use with a diimonium compound, mutual interaction is generated between the two near-infrared absorption compounds in a long-term storage, and this will cause a problem that both the near-infrared radiation absorptivity and the visible light transmittance change.

Furthermore, since the cyanine compound has a low light resistance in general, both the near-infrared absorptivity and the visible light transmittance of a near-infrared shield using the cyanine alone will change.

In addition, a near-infrared shield used in a display front plate is preferred to have excellent near-infrared shielding property and visible light transmittance, and be capable of enduring long-term storage under a condition of high temperature, high humidity and light irradiation.

SUMMARY OF THE INVENTION

A near-infrared shield according to the present invention is a near-infrared shield including a base and a near-infrared absorption layer disposed on one main surface of the base, and the near-infrared shield is characterized in that when irradiated from the near-infrared absorption layer side with xenon light having a wavelength of 380 nm to 1200 nm for 16 hours at an illuminance of 60 W/m² (an energy density in a range of 300 nm to 400 nm) under a condition of BPT (Black Panel Temperature) of 63° C. and a relative humidity of 50%, chromaticity changes Δx and Δy of the transmitted light before and after the irradiation, which are shown in a chromaticity diagram of a CIE1931XYZ color system, are 0.005 or less, respectively.

The near-infrared absorption layer includes a diimonium compound containing a sulfonic acid imide derivative, and a compound including a substituted benzenedithiol metal complex anion having a structure represented by the following chemical formula (1) and a cation having a structure represented by the following chemical formula (2) as counter ions.

(1)

In chemical formula (1), $R_1$ and $R_2$ each independently denote at least one substituent selected from the group consisting of an alkyl group having 1 to 6 carbon atoms, an alkylamino group having 1 to 8 carbon atoms, a substituted or unsubstituted morpholino group, a substituted or unsubstituted thiomorpholino group, a substituted or unsubstituted piperazino group and a substituted or unsubstituted phenyl group, and M denotes a transition metal.

(2)

In chemical formula (2), $Q_1$ and $Q_2$ each independently denote at least one heterocyclic compound selected from the group consisting of a five-membered nitrogen-containing heterocycle, a condensed ring comprising a five-membered nitrogen-containing heterocycle, a six-membered nitrogen-containing heterocycle and a condensed ring comprising a six-membered nitrogen-containing heterocycle, and $R_3$ and $R_4$ each independently denote an alkyl group having 1 to 8 carbon atoms, and n denotes a number of 2, 3 or 4.

A display front plate of the present invention is characterized in that the near-infrared shield is disposed on a substrate.

DETAILED DESCRIPTION OF THE INVENTION

A near-infrared shield of the present invention includes a base and a near-infrared absorption layer disposed on one main surface of the base. The near-infrared shield of the present invention is characterized in that, when irradiated from the near-infrared absorption layer side with xenon light having a wavelength of 380 nm to 1200 nm for 16 hours at an illuminance of 60 W/m² (an energy density in a range of 300 nm to 400 nm) under a condition of BPT of 63° C. and a relative humidity of 50%, chromaticity changes Δx, Δy of the transmitted light before and after the irradiation, which are shown in a chromaticity diagram of CIE1931XYZ color system, are 0.005 or less, respectively. The thus obtained near-infrared shield has an excellent near-infrared shielding property and an excellent light resistance, and the near-infrared absorptivity does not deteriorate even after long-term storage.

One example of the near-infrared shield has a base and a near-infrared absorption layer disposed on one main surface of the base, where the near-infrared absorption layer includes a diimonium compound including a sulfonic acid imide derivative and a compound including a substituted benzenedithiol metal complex anion having a structure represented by the following chemical formula (1) and a cation having a structure represented by the following chemical formula (2) as counter ions.

(1)

In chemical formula (1), $R_1$ and $R_2$ each independently denote at least one substituent selected from the group consisting of an alkyl group having 1 to 6 carbon atoms, an alkylamino group having 1 to 8 carbon atoms, a substituted or unsubstituted morpholino group, a substituted or unsubstituted thiomorpholino group, a substituted or unsubstituted piperazino group and a substituted or unsubstituted phenyl group, and M denotes a transition metal.

(2)

In chemical formula (2), $Q_1$ and $Q_2$ each independently denote at least one heterocyclic compound selected from the group consisting of a five-membered nitrogen-containing heterocycle, a condensed ring comprising a five-membered nitrogen-containing heterocycle, a six-membered nitrogen-containing heterocycle and a condensed ring comprising a six-membered nitrogen-containing heterocycle, and $R_3$ and $R_4$ each independently denote an alkyl group having 1-8 carbon atoms, and n denotes a number of 2, 3 or 4.

A near-infrared shield obtained according to this embodiment has an excellent near-infrared shielding property and an excellent light resistance, and the near-infrared absorptivity does not deteriorate even after long-term storage.

It is preferable that at least one substituent bonded to the nitrogen atoms at the ends of the cation sites of the diimonium compound containing the sulfonic acid imide derivative is an alkyl group having a branched chain structure. The thus obtained near-infrared shield has an excellent near-infrared shielding property and an excellent visible light transmittance, and it can be stored for a long period of time even being subjected to high temperature, high humidity and light irradiation.

It is more preferable that the near-infrared absorption layer further includes a resin to disperse the diimonium compound and the compound including the counter ions so that these compounds can be dispersed and fixed onto the base. It is further preferable that the resin has a glass transition temperature of 80° C. or higher so that the diimonium compound and the compound including the counter ions can be fixed more firmly in order to improve the heat resistance.

It is further preferable that the near-infrared absorption layer further includes a compound having a maximum absorption wavelength in a wavelength region ranging from 580 nm to 620 nm, so that a neon emission of a PDP can be absorbed, for example.

It is further preferable that the near-infrared absorption layer includes a compound having a maximum absorption wavelength in a wavelength region ranging from 540 nm to 570 nm, so that the photopic contrast of the display can be improved, for example.

It is further preferable that the near-infrared absorption layer includes a compound having a maximum absorption wavelength in a wavelength region ranging from 480 nm to 500 nm, so that the photopic contrast of the display under three-wavelength fluorescent light can be improved, for example.

It is more preferable that the near-infrared absorption layer has a Haze value of not more than 1%, since when it is used as a PDP front plate for example, sharpness of the image will not be degraded. Here, the Haze value denotes a value regarding haze inside or on a plastic, which is defined by a JIS (Japanese Industrial Standards) K7105.

It is more preferable that the near-infrared shield in this embodiment has a hard-coat layer and an antireflection layer that are disposed on the surface of the base, opposing to the main surface on which the near-infrared absorption layer is disposed, so that a protection function and an antireflection function are further provided. In a conventional technique, a near-infrared absorption layer and an antireflection layer are adhered separately on respective glass substrates for display front panels. In the present invention, by combining the near-infrared absorption layer and the antireflection layer on one base as mentioned above, the number of members to be adhered to the front plate can be decreased.

The display front plate of the present invention is characterized in that a near-infrared shield according to this embodiment is disposed on a substrate. The thus provided display front plate maintains an excellent near-infrared shielding property for a long period of time.

Hereinafter, the present invention will be described by way of illustrative embodiments with reference to the attached drawings.

First Embodiment

Figure 1:
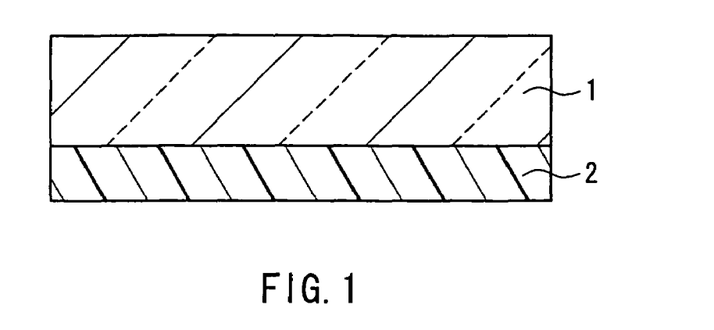
FIG. 1 is a cross-sectional view showing an example of a near-infrared shield according to the present invention.

FIG. 1 is a cross-sectional view showing one example of a near-infrared shield of the present invention. The near-infrared shield in First Embodiment includes a base 1 and a near-infrared absorption layer 2 disposed on one main surface of the base 1.

The base 1 is not limited particularly in the shape, manufacturing method or the like as long as it is made of a translucent material. For example, it can be formed by processing a material into a film or a sheet, and the material is selected from, for example, a polyester-based resin, a polycarbonate-based resin, a polyacrylic ester-based resin, an alicyclic polyolefin-based resin, a polystyrene-based resin, a polyvinyl chloride-based resin, a polyvinyl acetate-based resin, a polyethersulfone-based resin, a triacetylcellulose-based resin and the like. The process for shaping the material into a film or a sheet is selected from, for example, extrusion molding, calender molding, compression molding, injection molding, and a method of dissolving the resin in a solvent and casting. The base 1 is typically about 10 µm to about 500 µm in thickness. Additives such as an antioxidant, a flame retardant, an ultraviolet absorbent, a lubricant, and an antistatic agent can be added to the material.

The near-infrared absorption layer 2 is not limited particularly as long as it includes, as a near-infrared absorption compound, a diimonium compound containing a sulfonic acid imide derivative, and a compound including a substituted benzenedithiol metal complex anion having a structure represented by the following chemical formula (1) and a cation having a structure represented by the following chemical formula (2) as counter ions.

(1)

In chemical formula (1), $R_1$ and $R_2$ each independently denote at least one substituent selected from the group consisting of an alkyl group having 1 to 6 carbon atoms, an alkylamino group having 1 to 8 carbon atoms, a substituted or unsubstituted morpholino group, a substituted or unsubstituted thiomorpholino group, a substituted or unsubstituted piperazino group and a substituted or unsubstituted phenyl group, and M denotes a transition metal.

(2)

In chemical formula (2), $Q_1$ and $Q_2$ each independently denote at least one heterocyclic compound selected from the group consisting of a five-membered nitrogen-containing heterocycle, a condensed ring comprising a five-membered nitrogen-containing heterocycle, a six-membered nitrogen-containing heterocycle and a condensed ring comprising a six-membered nitrogen-containing heterocycle; and $R_3$ and $R_4$ each independently denote an alkyl group having 1 to 8 carbon atoms, and n denotes a number of 2, 3 or 4.

Particularly, a cation having a structure represented by the chemical formula (2) is selected preferably from the cations represented by the following chemical formulae (3) to (5).

(3)

(4)

(5)

The diimonium compound can be selected from those having structures represented by the following chemical formulae (6) and (7), for example.

(6)

-continued (7)

In the chemical formulae (6) and (7), $R_5$-$R_{12}$ denote substituted or unsubstituted alkyl groups respectively, X—, $Y^{2-}$— denote monovalent and divalent counter-anions respectively, and n denotes a number of 1 or 2.

It is preferable that at least one of the $R_5$-$R_{12}$ bonded to the nitrogen atoms at the ends of the cation sites in the chemical formulae (6) and (7) is an alkyl group having a branched chain structure. The $R_5$-$R_{12}$ can be alkyl groups different from each other. Alternatively, some or all of them can be identical alkyl groups. The X—, $Y^{2-}$— are not limited particularly as long as they include sulfonic acid imide derivatives as the counter-anions. A near-infrared absorption layer 2, which is obtained by using a diimonium compound as an alkyl group that includes a sulfonic acid imide derivative and that at least one of the above-mentioned $R_5$-$R_{12}$ has a branched chain structure, will be excellent in near-infrared shielding property and visible light transmission, and the near-infrared absorption layer 2 has a longer life even under a condition of high temperature, high humidity and light irradiation. Though there is no particular limitation for the sulfonic acid imide derivative, for example, a perfluoroalkane sulfonic acid imide ion or the like is used preferably. It is particularly preferable to use a trifluoromethane sulfonic acid imide ion or the like such as bis(trifluoromethane sulfonyl) imidic acid ion.

The near-infrared absorption layer 2 can include further a diimonium compound represented by the chemical formula (6) where X— is, for example: a halogen ion such as a fluorine ion, a chlorine ion, a bromine ion, and an iodine ion; an inorganic ion such as a thiocyanic acid ion, a hexafluoroantimonic acid ion, a perchloric acid ion, a periodic acid ion, a nitric acid ion, a tetrafluoroboric acid ion, a hexafluorophosphoric acid ion, a molybdic acid ion, a tungstic acid ion, a titanic acid ion, a vanadic acid ion, a phosphoric acid ion, and a boric acid ion; an organic carboxylic acid ion such as an acetic acid ion, a lactic acid ion, a trifluoroacetic acid ion, a propionic acid ion, a benzoic acid ion, an oxalic acid ion, a succinic acid ion, and a stearic acid ion; an organic sulfonic acid ion such as a methanesulfonic acid ion, a toluenesulfonic acid ion, a naphthalenesulfonic acid ion, a chlorobenzene-sulfonic acid ion, a nitrobenzenesulfonic acid ion, a dodecyl-sulfonic acid ion, a benzenesulfonic acid ion, an ethane-sulfonic acid ion, and a trifluoromethane sulfonic acid ion.

Furthermore, the near-infrared absorption layer 2 can include a diimonium compound represented by the chemical formula (7) where $Y^{2-}$— is, for example: a naphthalenedisul-fonic acid derivative ion such as a naphthalene-1,5-disulfonic acid ion, an R acid ion (e.g., 2-naphthol-3,6-disulfonic acid ion), a G acid ion (e.g., 7-hydroxynaphthalene sulfonic acid ion), an H acid ion (e.g., 1-amino-8-naphthol-3,6-disulfonic acid ion), a benzoyl H acid ion, a p-chlorobenzoyl H acid ion, a chloroacetyl H acid ion, a C acid ion (e.g., 3-amino-6-chlorotoluene-4,4-sulfonic acid ion), p-toluenesulfonyl R acid ion, a naphthalene-1,6-disulfonic acid ion, and a 1-naphthol-4,8-disulfonic acid ion; and an organic acid ion such as a 4,4'-diaminostilbene-2,2'-disulfonic acid ion, a naphthalic acid ion, a naphthalene-2,3'-dicarboxylic acid ion, a diphenic acid ion, a stilbene-4,4'-dicarboxylic acid ion, a 6-sulfo-2-oxy-3-naphthoic acid ion, an anthraquinone-1,8-disulfonic acid ion, a 1,6-diaminoanthraquinone-2,7-disulfonic acid ion, a 2-(4-sulfonyl)-6-aminobenzotriazole-5-sulfonic acid ion, a 6-(3-methyl-5-pyrazonyl)-1,3-disulfonic acid ion, and a 1-naphthol-6-(4-amino-3-sulfo)anilino-3-sulfonic acid ion.

It is more preferable that the diimonium compound containing the sulfonic acid imide derivative is a compound having a maximum absorption wavelength in a wavelength region ranging from 950 nm to 1150 nm. It is more preferable that the compound including the counter ions has a maximum absorption wavelength in a wavelength region ranging from 800 nm to 900 nm. By combining these compounds, substantially all of the near-infrared radiation in a wavelength region ranging from 820 nm to 1100 nm can be absorbed.

The method for forming the near-infrared absorption layer 2 on one main surface of the base 1 is not limited particularly. For example, a coating process such as roller coating, die coating, air knife coating, blade coating, spin coating, reverse coating, and gravure coating; and a printing process such as gravure printing, screen printing, offset printing, and inkjet printing, can be applied.

It is more preferable that the near-infrared absorption layer 2 further includes a resin for dispersing the near-infrared absorption compound including the diimonium compound and the compound including the counter ions. Thereby, the near-infrared absorption compound can be dispersed and fixed onto the base. The resin can be selected from an acrylic resin, a polyurethane resin, a polyvinyl chloride resin, an epoxy resin, a polyvinyl acetate resin, a polystyrene resin, a cellulose resin, a polybutyral resin, a polyester resin and the like. Alternatively, a polymer blend prepared by blending two or more of these resins can be used. Use of a resin having a glass transition temperature of 80° C. or higher is preferred particularly since the near-infrared absorption compound is fixed firmly with the resin so that the heat resistance is improved. It is further preferable to use a resin including a hydrophobic component together, since the temperature-humidity resistance can be improved.

The near-infrared absorption layer 2 can include further a solvent to dissolve the resin. This solvent is not limited particularly as long as it will not degrade the solubility of the near-infrared absorption compound and the resin, and it can be selected from, for example, methyl ethyl ketone, methyl isobutyl ketone, ethyl acetate, propyl acetate, ethylcellosolve, butylcellosolve, toluene, xylene, tetrahydroxyfuran and the like.

It is more preferable that the near-infrared absorption layer 2 further includes a compound having a maximum absorption wavelength in a wavelength region ranging from 580 nm to 620 nm so that a neon emission can be absorbed. The neon emission is a factor to degrade the color reproducibility of the PDP. Therefore, the red color of the PDP can be developed more sharply when this near-infrared shield is used to absorb the neon emission. The compound is not limited particularly as long as it does not change the spectral transmittance of the near-infrared absorption layer 2 in the entire wavelength region ranging from 820 nm to 1100 nm, and it can be selected from organic dye compounds based on, for example, cyanine azlenium, squalium, diphenylmethane, triphenylmethane, oxazine, azine, tiopium, viologen, azo, azo-metallic complex salts, azaporphyrin, bisazo, anthraquinone, phthalocyanine and the like. It is further preferable that, when the near-infrared absorption layer 2 includes a resin, the compound does not change the compatibility between the resin and the near-infrared absorption compound.

It is more preferable that the near-infrared absorption layer 2 further includes a compound having a maximum absorption wavelength in a wavelength region ranging from 540 nm to 570 nm so that, for example, a photopic contrast of the display will be improved. The compound is not limited particularly as long as it does not change the spectral transmittance of the near-infrared absorption layer 2 in the entire wavelength region ranging from 820 nm to 1100 nm, and it can be selected from organic dye compounds based on, for example, cyanine azlenium, squalium, diphenylmethane, triphenylmethane, oxazine, azine, tiopium, viologen, azo, azo-metallic complex salts, azaporphyrin, bisazo, anthraquinone, phthalocyanine and the like. It is further preferable that, when the near-infrared absorption layer 2 includes a resin, the compound does not change the compatibility between the resin and the near-infrared absorption compound.

It is still more preferable that the near-infrared absorption layer 2 further includes a compound having a maximum absorption wavelength in a wavelength region ranging from 480 nm to 500 nm so that, for example, a photopic contrast of the display under three-wavelength fluorescent light will be improved. The compound is not limited particularly as long as it does not change the spectral transmittance of the near-infrared absorption layer 2 in the entire wavelength region ranging from 820 nm to 1100 nm, and it can be selected from organic dye compounds based on, for example, cyanine azlenium, squalium, diphenylmethane, triphenylmethane, oxazine, azine, tiopium, viologen, azo, azo-metallic complex salts, azaporphyrin, bisazo, anthraquinone, phthalocyanine and the like. It is further preferable that, when the near-infrared absorption layer 2 includes a resin, the compound does not change the compatibility between the resin and the near-infrared absorption compound.

It is more preferable that the near-infrared shield in this embodiment has a Haze value of not more than 1%. If the Haze value exceeds 1%, disadvantages such as degradation in the image sharpness can occur when the near-infrared shield is used for a front plate of a PDP.

It is preferable for the near-infrared shield in this embodiment that the spectral transmittance in a wavelength region ranging from 820 nm to 1100 nm is not less than 0.5% and not more than 13%. When the spectral transmittance in the wavelength region exceeds 13%, unfavorable phenomena such as a malfunction of a remote control and a color change of the near-infrared shield may occur.

It is preferable that the near-infrared absorption layer 2 has a thickness ranging from 2 μm to 15 μm, more preferably, from 3 μm to 10 μm. When the thickness of the near-infrared absorption layer 2 is less than 2 μm, a content of a near-infrared absorption compound to be added to the resin must be increased in order to keep the spectral transmittance of the near-infrared radiation (light emission in a region ranging from 820 nm to 1100 nm) to 20% or less, and this can cause a problem that a undissolved near-infrared absorption compound will increase the Haze value. When the thickness exceeds 15 μm, the spectral transmittance in a wavelength region ranging from 820 nm to 1100 nm can be maintained not to exceed 20%, but a free solvent remains in the near-infrared absorption layer 2, and the residual solvent can cause a problem as it will dissolve the near-infrared absorption compound again over time.

Second Embodiment

Figure 2:
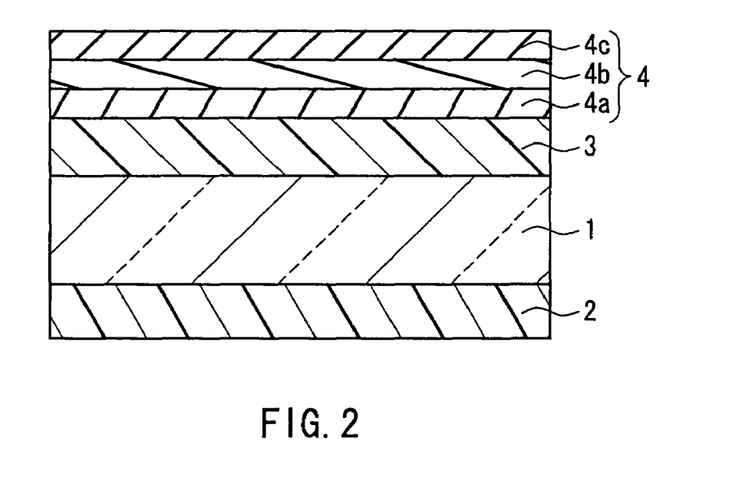
FIG. 2 is a cross-sectional view showing another example of a near-infrared shield according to the present invention.

FIG. 2 is a cross-sectional view showing another example of a near-infrared shield of the present invention. In FIG. 2, members identical to those of the near-infrared shield as shown in FIG. 1 are provided with identical numbers and the explanation will be omitted. The identical members have the same effects.

The near-infrared shield in this embodiment includes a base 1, a near-infrared absorption layer 2 disposed on one main surface of the base 1, a hard-coat layer 3 disposed on the other main surface of the base 1, and an antireflection layer 4 disposed on the hard-coat layer 3. The antireflection layer 4 is formed of three layers different from each other in the refractive indices, more specifically, a middle refractive index layer 4a, a high refractive index layer 4b and a low refractive index layer 4c in this order when viewed from the hard-coat layer 3 side.

The material of the hard-coat layer 3 is not limited particularly as long as it is hard and translucent. The examples include thermosetting resin compositions, electromagnetic wave setting resin compositions and the like based on urethane, melamine, epoxy and acryl. Particularly, an electromagnetic wave setting resin composition with a hard surface is used more preferably. It is more preferable that the hard-coat layer 3 further includes inorganic fine particles. A hard-coat layer 3 including the inorganic fine particles can have harder surfaces, and shrinkage caused by curing of the resin or the like can be relieved. Examples of the inorganic fine particles include silicon dioxide (silica), tin-doped indium oxide, antimony-doped stannic oxide, zirconium oxide and the like.

The method of forming the hard-coat layer 3 on the base 1 is not limited particularly, and it can be selected, for example, a coating process such as roller coating, die coating, air knife coating, blade coating, spin coating, reverse coating, gravure coating and the like; and a printing process such as gravure printing, screen printing, offset printing, inkjet printing and the like. It is preferable that the thickness of the hard-coat layer 3 is from 1 μm to 10 μm, and more preferably, from 2 μm to 7 μm.

It is preferable that the average reflectance of the antireflection layer 4 is in a range from 0.05% to 1% in a wavelength region ranging from 450 nm to 650 nm, and it is from 0.05% to 1.5% in a wavelength region ranging from 650 nm to 750 nm. The color specification of the reflected light at the antireflection layer 4 is preferably in a range of $-8 \leq a^* \leq 8$, $-20 \leq b^* \leq -2$, according to the CIE1976 (L*a*b*) color system. More preferable ranges are $-4 \leq a^* \leq 3$, $-15 \leq b^* \leq -4$, and further preferably, $-1 \leq a^* \leq 1$, $-10 \leq b^* \leq -6$. A near-infrared shield obtained by setting the antireflection layer 4 as mentioned above has a low reflectance in a wide wavelength region and provides reflected light whose chromaticity is in an achromatic color region. When the near-infrared shield is used for a display front plate, for example, the display grade can be improved.

The method of forming the antireflection layer 4 on the hard-coat layer 3 is not limited particularly, and it can be selected from, for example, a coating process such as roller coating, die coating, air knife coating, blade coating, spin coating, reverse coating, gravure coating and the like; and a printing process such as gravure printing, screen printing, offset printing, inkjet printing and the like.

The middle refraction index layer 4a is not limited particularly as long as the refractive index nm is in a range from 1.53 to 1.65, more preferably from 1.57 to 1.63, and the material has translucency. Preferred examples of the material include a coating composition or the like prepared by dispersing homogeneously inorganic fine particles having a high refractive index in an organic substance. For the organic substance, for example, crosslinkable organic materials such as a thermosetting resin composition, an electromagnetic wave setting resin composition or the like, can be used. For the inorganic fine particles, for example, fine particles of titanium oxide, stannic oxide, indium oxide, tin-doped indium oxide (ITO), antimony-doped stannic oxide (ATO), zirconium oxide, zinc oxide, ceric oxide and the like, can be used. Particularly, ITO fine particles or ATO fine particles having high electroconductivity is preferred further, since an effect of preventing electrostatic charge in the middle refractive index layer 4a can be obtained.

It is preferable for the middle refractive index layer 4a that the product $n_m d_m$ (optical thickness) of the refractive index $n_m$ and the thickness $d_m$ is in a range from 110 nm to 163 nm, and more preferably from 125 nm to 150 nm.

The high refractive index layer 4b is not limited particularly as long as the refractive index $n_h$ is in a range from 1.70 to 1.95, more preferably from 1.76 to 1.84, and the material has translucency. Preferred examples of the material include a coating composition or the like prepared by dispersing homogeneously titanium oxide fine particles as an inorganic fine particles having the highest refractive index in an organic substance. For the organic substance, for example, crosslinkable organic materials such as a thermosetting resin composition or an electromagnetic wave setting resin composition can be used. The high refractive index layer 4b is formed as a film where the coating composition is firmly crosslinked. For the titanium oxide fine particles, it is more preferable to use titanium oxide fine particles having a rutile structure, which has a weak photocatalysis and a high refractive index. Since titanium oxide particles having an anatase structure is photocatalytic, it would decompose the resin composition of the film and the organic materials such as the base due to ultraviolet irradiation. It is preferable that the content of the titanium oxide fine particles is from 50 wt % to 65 wt % with respect to the whole weight of the cured high refractive index layer 4b. Electroconductive particles such as antimony oxide, zinc oxide, tin oxide or the like can be added to the titanium oxide as long as the refractive index can be satisfied. Due to the addition of the electroconductive particles, the high refractive index layer 4b can be applied with a charging function.

It is preferable for the high refractive index layer 4b that the product $n_h d_h$ (optical thickness) of the refractive index $n_h$ and the thickness $d_h$ is in a range from 225 nm to 325 nm, and more preferably from 250 nm to 300 nm.

It is also preferable that a part of the organic substance in the high refractive index layer 4b has a refractive index in a range from 1.60 to 1.80, more preferably, from 1.65 to 1.75, so that the refractive index can be raised even when the content of the inorganic fine particles in the high refractive index layer 4b is reduced. Reduction of the content of the inorganic fine particles serves to prevent degradation in crosslinking of the organic substance in the high refractive index layer 4b, and thus curing of the organic substance is accelerated to improve the excoriation resistance of this layer. When the refractive index of the organic substance is lower than 1.60, the effect to be obtained by reducing the fine particle content in the high refractive index layer 4b becomes insufficient. When the refractive index exceeds 1.80, the reflected light becomes yellowish excessively, and this tendency is unfavorable. For the highly-refractive organic substance whose refractive index is in a range of 1.60 to 1.80, organic compounds or the like containing aromatic rings, sulfur, bromine or the like can be used. More preferably for example, diphenyl sulfide, the derivative or the like can be used.

The low refractive index layer 4c is not limited particularly as long as the refractive index $n_l$ is in a range from 1.30 to 1.47, more preferably from 1.35 to 1.45, and the material has translucency. An example of the preferred material is a coating composition that is prepared by dispersing homogeneously inorganic fine particles such as a fluorine-based or silicone-based organic compound, silicon dioxide (silica), magnesium fluoride and the like in an organic substance. For the organic substance, for example, crosslinkable organic materials such as a thermosetting resin composition, an electromagnetic wave setting resin composition or the like can be used. Particularly, in a case where an ultraviolet setting resin composition is used for the electromagnetic wave setting resin composition, it is preferable that an inactive gas such as nitrogen is purged so as to perform ultraviolet irradiation under a condition that the oxygen concentration is not more than 1000 ppm. Thereby, polymerization inhibition due to the oxygen can be prevented.

It is preferable for the low refractive index layer 4c that the product $n_l d_l$ (optical thickness) of the refractive index $n_l$ and the thickness $d_l$ is in a range from 110 nm to 163 nm, and more preferably from 125 nm to 150 nm.

The antireflection layer 4 in this embodiment is not limited particularly to the above-mentioned configuration as long as it can reduce reflection of external light. For example, the number of layers of the antireflection layer can be determined suitably such as a single layer, a double layer or a triple layer structure, corresponding to the reflection degree, grade of the reflected light and the cost. In general, for providing antireflection with a single layer structure, the optical thickness as the product of the refractive index and the thickness is set to $\lambda/4$ ($\lambda$ denotes wavelength). For a double layer structure, for reducing the reflectance of only a wavelength with high visibility for the human eyesight, the layers are laminated in an order of a high refractive index layer and a low refractive index layer from the base side, and the optical thicknesses are set to $\lambda/4$, $\lambda/4$ respectively. For lowering the reflectance in a wide wavelength region, the layers are laminated in an order of a high refractive index layer and a low refractive index layer from the base side, and the optical thicknesses are set to $\lambda/2$, $\lambda/4$ respectively. For the triple layer structure, for lowering the reflectance in a still wider wavelength region, layers are laminated in an order of a middle refractive index layer, a high refractive index layer and a low refractive index layer from the base side, and the optical thicknesses are set to $\lambda/4$, $\lambda/2$, and $\lambda/4$ respectively.

The near-infrared shield according to the First Embodiment can be used alone as a member of the display front plate. However, as shown in the Second Embodiment, it is more preferable to use a near-infrared shield provided with plural functions such as antireflection.

Third Embodiment

Figure 3:
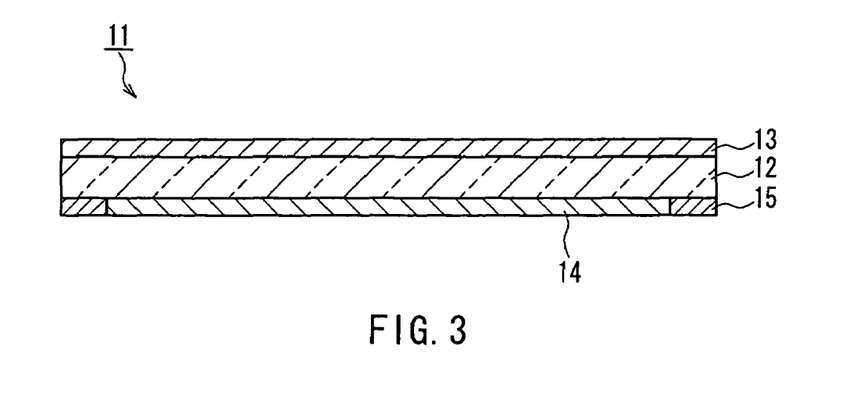
FIG. 3 is a cross-sectional view showing a display front plate according to the present invention.

FIG. 3 is a cross-sectional view showing an example of a display front plate of the present invention. A display front plate 11 in this embodiment includes a substrate 12, a near-infrared shield 13 disposed on one main surface of the substrate 12, an electromagnetic wave shield 14 disposed on the other main surface, and an electrode (ground) 15. The material of the substrate 12 is not limited particularly as long as it has translucency, and for example, tempered glass or the like can be used. For the near-infrared shield 13, for example, the near-infrared shield according to the Second Embodiment can be used without any substantial modification. A display front plate obtained according to this embodiment will be excellent in a near-infrared shielding property, and it has a function of a near-infrared shield whose near-infrared absorptivity will not be degraded even after long-term storage, and also a function of an electromagnetic wave shield.

The present invention will be explained more in detail by referring to Examples. The present invention is not limited to the Examples below.

Example 1

3.8 weight parts of N,N,N',N'-tetrakis(aminophenyl)-p-phenylenediamine, 21 weight parts of isobutyl bromide, and 15 weight parts of potassium carbonate were added to 30 weight parts of dimethyl formamide (DMF) and allowed to react at 80° C. for one hour and at 90° C. for 7 hours while being subjected to nitrogen substitution, and further allowed to react at 130° C. for one hour. This reaction liquid was cooled and then filtrated. To the filtrated liquid, 30 weight parts of isopropanol was added, and stirred for one hour at temperature of not higher than 5° C. The thus formed crystal was washed with methanol and then dried, thereby 2.5 weight parts of a crystal of N,N,N',N'-tetrakis(di(p-di(isobutyl)aminophenyl)-p-phenylenediamine was obtained.

Next, 10 weight parts of bis(trifluoromethansulfon)imidic acid silver and 11.8 weight parts of the thus formed N,N,N',N'-tetrakis(di(p-di(isobutyl)aminophenyl)-p-phenylenediamine were added to 100 weight parts of DMF, and allowed to react at 60° C. for 3 hours. The thus formed silver was separated by filtration, and 30 weight parts of water was added to the filtrated liquid. The thus formed deposit was filtrated again and washed, and then dried to obtain 15.7 weight parts of bis(trifluoromethansulfone) imidic acid N,N,N',N'-tetrakis (di(p-di(isobutyl)aminophenyl)-p-phenylenedimonium. In a measurement, the maximum absorption wavelength and the molar absorption coefficient of the thus formed diimonium compound were 1074 nm and 10500 L·mol$^{-1}$·cm$^{-1}$, respectively.

Subsequently, for the base, a polyethylene terephthalate (PET) film ("U-34" manufactured by Toray Industries) was prepared. The film was 100 μm in thickness with both surfaces having been treated to facilitate adhesion. The materials for the near-infrared absorption layer were: 6 weight parts of the diimonium compound formed as mentioned above; 1 weight part of a compound ("SD50-E04N" manufactured by SUMITOMO SEIKA CHEMICALS CO., LTD., the maximum absorption wavelength: 877 nm) including a substituted benzenedithiol metal (copper) complex anion having a structure represented by the chemical formula (1) and the cation having a structure as represented by the chemical formula (2) as counter ions; 1 weight part of a compound ("SD50-E05N" manufactured by SUMITOMO SEIKA CHEMICALS CO., LTD., the maximum absorption wavelength: 833 nm) including a substituted benzenedithiol metal (copper) complex anion having a structure represented by the chemical formula (1) and the cation having a structure as represented by the chemical formula (2) as counter ions; 100 weight parts of acrylic resin ("DIANAL BR-52" manufactured by Mitsubishi Rayon Co., Ltd.); 125 weight parts of methyl ethyl ketone; and 460 weight parts of toluene. These materials were mixed and stirred to provide a coating solution. The coating solution was coated on the base, using a micro-gravure coater such that a near-infrared absorption layer to be formed after drying the coating solution would be 4 μm in thickness. In this manner, a near-infrared shield according to Example 1 was manufactured.

Figure 4:
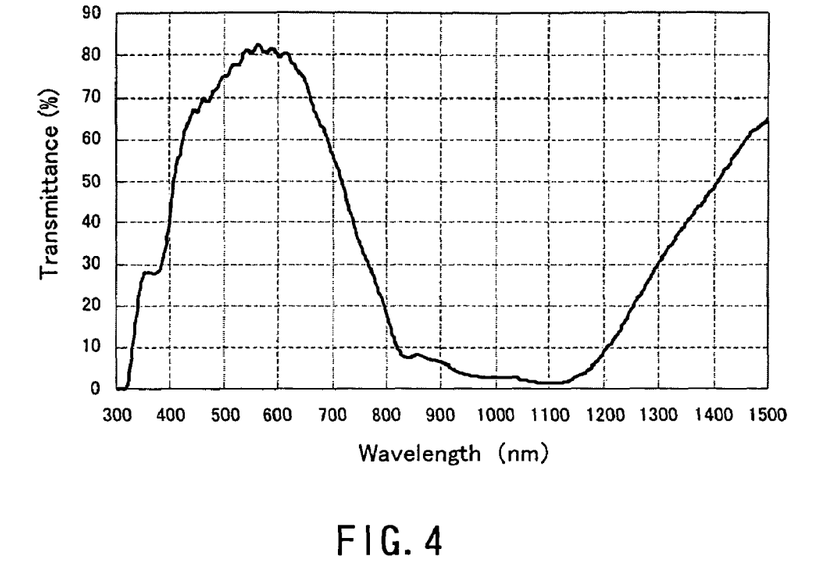
FIG. 4 is a graph showing a spectral transmittance of a near-infrared shield in Example 1.

The spectral transmittance of the near-infrared shield was measured with a spectrophotometer ("U-Best V-570" manufactured by JASCO Corporation). As shown in FIG. 4, the spectral transmittance in a wavelength region ranging from 820 nm to 950 nm was 10% or less, and the spectral transmittance in a wavelength region ranging from 950 nm to 1100 nm was 5% or less. The Haze value was 0.8%, and the chromaticity (x, y) of the transmitted light was (0.3215, 0.3464).

Figure 5:
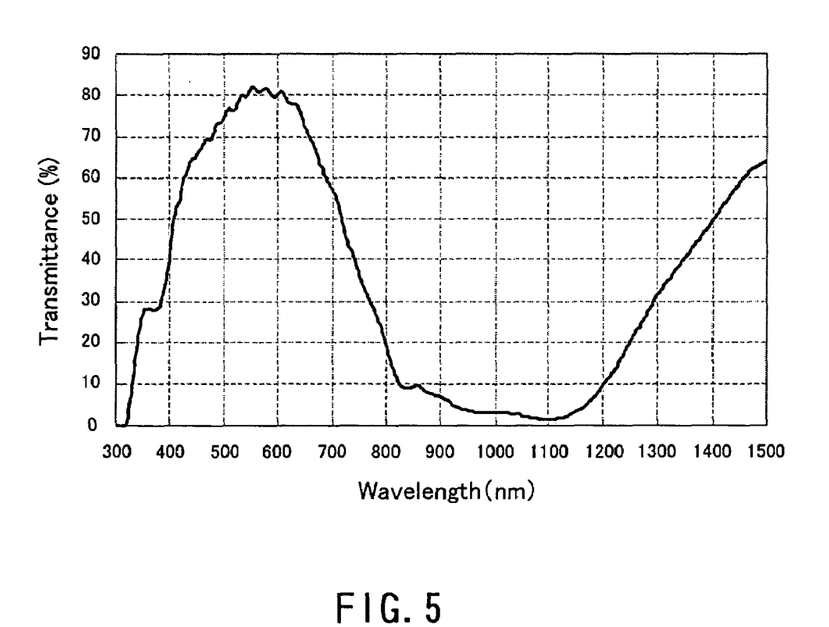
FIG. 5 is a graph showing a spectral transmittance of the near-infrared shield in Example 1 after a light resistance test.

A PET film having an UV-shielding function ("Lumilar QT58" manufactured by Toray Industries, transmittance at 380 nm: 0.6%) was superposed on the near-infrared absorption layer of the near-infrared shield, which was irradiated with light from the side of the PET film in order to perform a light resistance test. Specifically, using a weathering apparatus ("Super Xenon Weather Meter SX-75" manufactured by Suga Test Instruments Co., Ltd.), xenon light was irradiated from the side of the PET film for 16 hours at an illuminance of 60 W/m$^2$ (an energy density in a range of 300 to 400 nm), under a condition of BPT of 63° C. and a relative humidity of 50%. Due to the use of the PET film having an UV-shielding function, the wavelength of the xenon light irradiated on the near-infrared shield became 380 to 1200 nm. The spectral transmittance of the near-infrared shield after the light resistance test was measured in the same manner as mentioned above. The results are shown in FIG. 5. The spectral transmittance in a wavelength region ranging from 820 nm to 1100 nm was not changed substantially in comparison with the spectral transmittance before the light resistance test. The chromaticity changes were 0.0011 for Δx, and 0.0023 for Δy.

Here, the chromaticity changes Δx and Δy were calculated using the equations below.

$$\Delta x = |x_{int} - x_{end}|$$

$$\Delta y = |y_{int} - y_{end}|$$

In the equations, $x_{int}$ and $y_{int}$ denote chromaticity of transmitted light before the light resistance test, and $x_{end}$ and $y_{end}$ denote chromaticity of transmitted light after the light resistance test.

Example 2

A near-infrared shield was manufactured in the same manner as Example 1 except that 2.2 weight parts of a neon light shielding dye ("TAP-2" manufactured by Yamada Kagaku Co., Ltd., the maximum absorption wavelength: 594 nm) was added further to the material of the near-infrared absorption layer of Example 1. The spectral transmittance was measured as in Example 1. The spectral transmittance at a wavelength of 590 nm was 29%, the spectral transmittance at a wavelength in a region ranging from 820 nm to 950 nm was 15% or less, and the spectral transmittance at a wavelength in a region ranging from 950 nm to 1100 nm was 10% or less. The Haze value was 0.8%, and the chromaticity (x, y) of the transmitted light was (0.2984, 0.3401). According to a light resistance test performed as in Example 1 by using the near-infrared shield, the spectral transmittance in a wavelength region ranging from 820 nm to 1100 nm was not changed substantially in comparison with the spectral transmittance before the light resistance test, and the chromaticity changes of the transmitted light were 0.0012 for Δx, and 0.0025 for Δy.

Example 3

A near-infrared shield was manufactured in the same manner as Example 1 except that 0.15 weight parts of squalium dye having a maximum absorption wavelength of 484 nm and 0.3 weight parts of squalium dye having a maximum absorption wavelength of 552 nm were further added to the material of the near-infrared absorption layer in Example 2. The spectral transmittance was measured as in Example 1. The spectral transmittance at a wavelength of 490 nm was 44.5%, the spectral transmittance at a wavelength of 550 nm was 35.0%, the spectral transmittance at a wavelength of 590 nm was 28.5%, the spectral transmittance at a wavelength in a region ranging from 820 nm to 950 nm was 15% or less, and the spectral transmittance at a wavelength in a region ranging from 950 nm to 1100 nm was 10% or less. The Haze value was 0.8%, and the chromaticity (x, y) of the transmitted light was (0.3110, 0.3067). According to a light resistance test performed as in Example 1, the spectral transmittance in a wavelength region ranging from 820 nm to 1100 nm was not changed substantially in comparison with the spectral transmittance before the light resistance test, and the chromaticity changes of the transmitted light were 0.0018 for Δx, and 0.0030 for Δy.

Example 4

A near-infrared shield was manufactured in the same manner as Example 1 except that the base was made of a UV-shielding PET film ("Lumilar QT58" manufactured by Toray Industries) whose surfaces were treated for facilitating adhesion.

Next, 100 weight parts of acrylate-based UV-setting hard-coat material ("DeSolite Z7501" manufactured by JSR) containing silica ultrafine particles and 35 weight parts of methyl isobutyl ketone were mixed and stirred so as to prepare a coating solution. Using a micro-gravure coater, this coating solution was coated on a surface of the PET film opposite the surface provided with the near-infrared absorption layer, and dried. This was cured with UV irradiation at an intensity of 300 mJ/cm$^2$, thereby a hard-coat layer 4 μm in thickness was formed on the PET film.

Next, 100 weight parts of an acrylate-based UV-setting coating material ("Opstar TU4005" manufactured by JSR) containing inorganic ultrafine particles, 5 weight parts of polyfunctional acrylate ("DPHA" manufactured by Nippon Kayaku Co., Ltd.) and 200 weight parts of cyclohexanone were mixed and stirred to prepare a coating solution. This coating solution was coated using a micro-gravure coater on the hard-coat layer, and dried. Later, this was cured with UV irradiation at an intensity of 300 mJ/cm$^2$, thereby a middle refractive index layer (refractive index: 1.60) 72 μm in thickness was formed on the hard-coat layer.

Subsequently, 30 weight parts of titanium oxide ultrafine particles ("TTO55(A)" manufactured by Ishihara Techno Corporation), 1 weight part of dimethylamino ethyl methacrylate ("LIGHT-ESTER DM" manufactured by Kyoei Chemical Co., Ltd.), 4 weight parts of methacrylate containing phosphoric acid groups ("KAYAMER PM-21" manufactured by Nippon Kayaku Co., Ltd.), and 65 weight parts of cyclohexanone were mixed to prepare a composition. This composition was dispersed by using a sand grind mill so as to prepare a titanium oxide ultrafine dispersoid, in which 15 weight parts of acrylate-based UV-setting hard-coat material ("SANRAD H-601R" manufactured by Sanyo Chemical Industries, Ltd.) and 600 weight parts of methyl isobutyl ketone were blended and dispersed to prepare a coating solution. This coating solution was coated on the middle refractive index layer by using a micro-gravure coater, and dried. Later, this was cured with UV irradiation at an intensity of 500 mJ/cm$^2$, thereby a high refractive index layer (the content of the titanium oxide fine particles in the solid: 60 wt %, the refractive index: 1.80) 130 μm in thickness was formed on the surface of the middle refractive index layer.

Further, 100 weight parts of a thermosetting low-refractive-index antireflection material containing a fluorine-based polymer ("Opstar TT1006" manufactured by JSR) and 20 weight parts of methyl isobutyl ketone were mixed and stirred to prepare a coating solution. This coating solution was coated on the high refractive index layer by using a micro-gravure coater, and dried. Later, a heat treatment was carried out at 120° C. for 6 minutes, thereby a low refractive index layer (refractive index: 1.41) 92 μm in thickness was formed on the high refractive index layer.

The thus obtained product in Example 4 was a composite of a near-infrared shield, a hard-coat layer and an antireflection layer formed of a middle refractive index layer, a high refractive index layer and a low refractive index layer.

Figure 6:
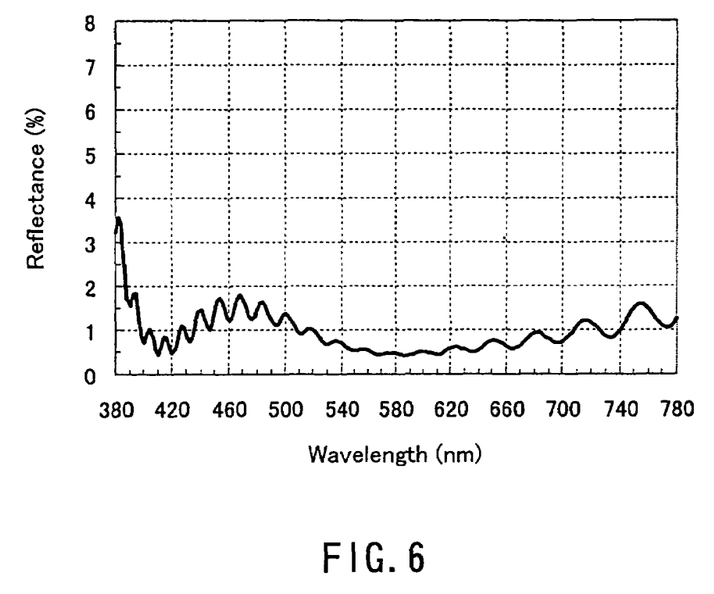
FIG. 6 is a graph showing a reflectance of a composite in Example 4, which includes a hard-coat layer, an antireflection layer and a near-infrared shield, when viewed from the antireflection layer side.
Figure 7:
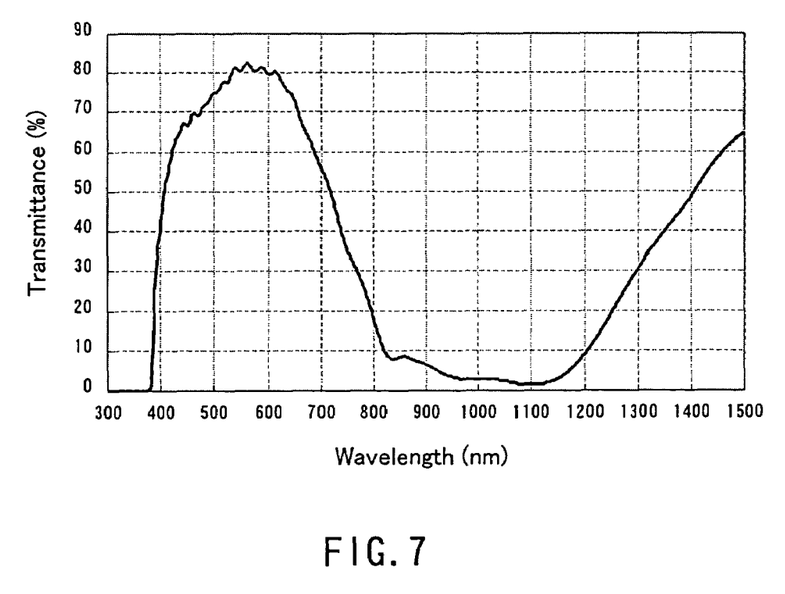
FIG. 7 is a graph showing a spectral transmittance of the composite in Example 4.

Next, reflectance of the composite from the antireflection layer side was measured using a spectrophotometer ("U-Best V-570 model" manufactured by JASCO Corporation). As shown in FIG. 6, the average reflectance in the wavelength region ranging from 450 nm to 650 nm was 1% or less, and the average reflectance in the wavelength region ranging from 650 nm to 750 nm was 1.5% or less. For the color specification of the reflected light, according to the CIE1976 (L*a*b*) color system, a* was −0.68, and b* was −8.96. The spectral transmittance of the composite in Example 4 was measured as in Example 1. As shown in FIG. 7, the spectral transmittance in a wavelength region ranging from 850 nm to 900 nm was 10% or less, and the spectral transmittance in a wavelength region ranging from 900 nm to 1100 nm was 10% or less. The Haze value was 0.9% and the chromaticity (x, y) of the transmitted light was (0.3235, 0.3484). A PET film having a UV-shielding function ("Lumilar QT58" manufactured by Toray Industries, transmittance at 380 nm: 0.6%) was superposed further on the antireflection layer of the composite, which was irradiated with xenon light from the antireflection layer side under the same condition as in Example 1 for performing a light resistance test. The spectral transmittance in the wavelength region ranging from 820 nm to 1100 nm was not changed substantially in comparison with the spectral transmittance before the light resistance test. The chromaticity changes were 0.001 for Δx and 0.0023 for Δy.

Example 5

A near-infrared shield was manufactured as in Example 2 except that the base was a UV-shielding PET film ("Lumilar QT58" manufactured by Toray Industries) 100 μm in thickness and whose surfaces were treated to facilitate adhesion. As in Example 4, a hard-coat layer, a middle refractive index layer, a high refractive index layer and a low refractive index layer were laminated in this order on the surface of the PET film opposite the surface provided with the near-infrared absorption layer. The near-infrared absorption layer on this near-infrared shield was bonded to one main surface of a glass substrate 2.3 mm in thickness. Furthermore, an electromagnetic wave shield mesh film (line width: 10 μm, line interval: 250 μm) was bonded to a surface of the glass substrate opposite the main surface, thereby forming an optical filter (display front plate) for an electronic display according to Example 5.

This filter was assembled in a color plasma display, and its bright room (photopic) contrast ratio was measured by a method for measuring a color plasma display module according to the Japan Electronics and Information Technical Industries Association Standards (EIAJED-2710A). The contrast ratio was 104.

Example 6

A near-infrared shield was manufactured as in Example 3 except that the base was a UV-shielding PET film ("Lumilar QT58" manufactured by Toray Industries) 100 μm in thickness and whose surfaces were treated to facilitate adhesion. As in Example 4, a hard-coat layer, a middle refractive index layer, a high refractive index layer and a low refractive index layer were laminated in this order on the surface of the PET film opposite the surface provided with the near-infrared absorption layer. The near-infrared absorption layer on this near-infrared shield was bonded to one surface of a glass substrate 2.3 mm in thickness. Furthermore, an electromagnetic wave shield mesh film (line width: 10 μm, line interval: 250 μm) was bonded to the opposite surface of the glass substrate, thereby forming an optical filter (display front plate) for an electronic display in Example 6.

In a measurement performed for this filter in the same method as in Example 5, the bright room (photopic) contrast ratio was 149.

Comparative Example 1

A near-infrared shield in Comparative Example 1 was manufactured as in Example 1 except that the diimonium compound in Example 1 was replaced by 6 weight parts of a diimonium compound ("CIR-1081" manufactured by Japan Carlit) containing an antimony hexafluoride ion as the counter-anion.

Figure 8:
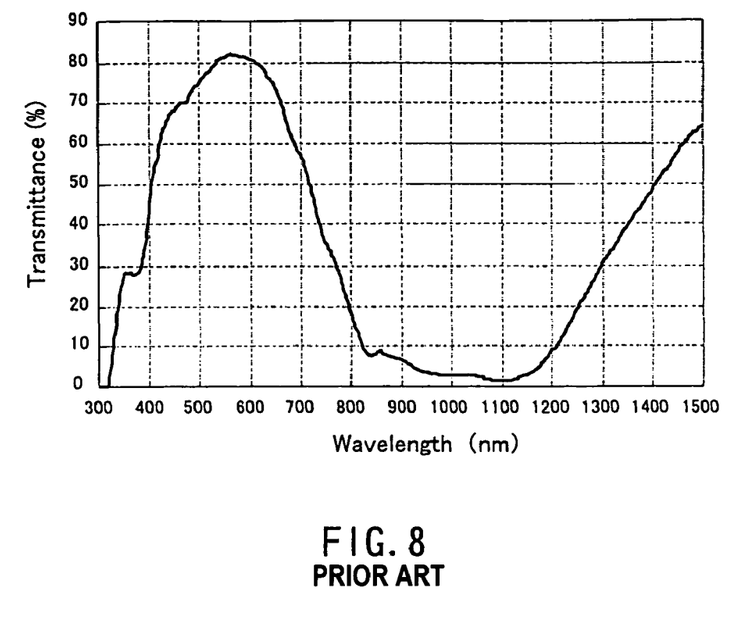
FIG. 8 is a graph showing a spectral transmittance of a near-infrared shield in Comparative Example 1.

In a measurement performed for the near-infrared shield as in Example 1, as shown in FIG. 8, the spectral transmittance in a wavelength region ranging from 820 nm to 950 nm was 10% or less, and the spectral transmittance in a wavelength region ranging from 950 nm to 1100 nm was 5% or less. The Haze value was 0.8%, and the chromaticity (x, y) was (0.3217, 0.3468).

Figure 9:
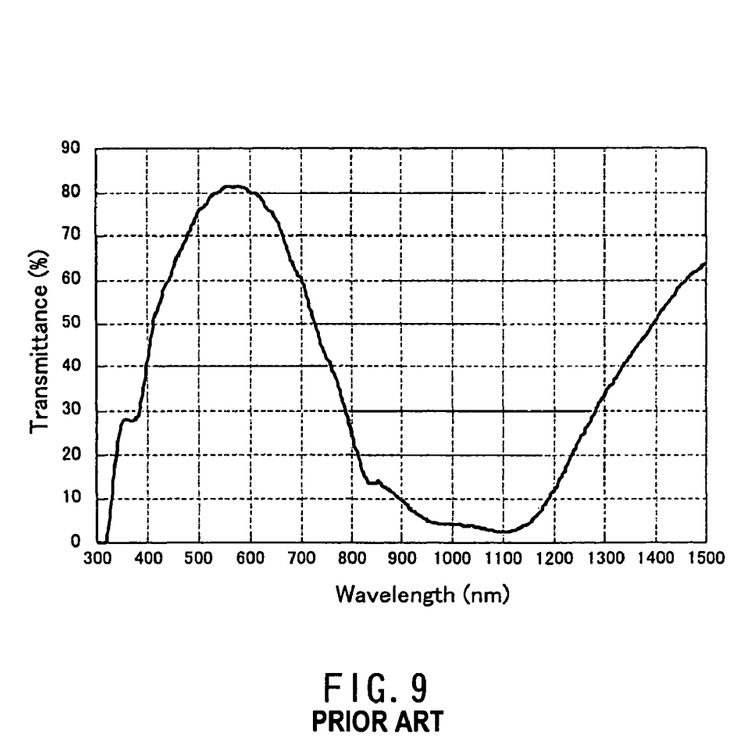
FIG. 9 is a graph showing a spectral transmittance of the near-infrared shield in Comparative Example 1 after a light resistance test.

A light resistance test was performed as in Example 1. The spectral transmittance of the near-infrared shield after the light resistance test was measured as mentioned above. As shown in FIG. 9, the spectral transmittance in the wavelength region ranging from 820 nm to 830 nm exceeded 13%. The chromaticity changes of the transmitted light were 0.0053 for Δx and 0.0080 for Δy, that is, the color change was considerable.

Comparative Example 2

A near-infrared shield in Comparative Example 2 was manufactured as in Example 1 except that the two kinds of compounds including counter ions in Example 1 was replaced by 0.4 weight parts of a cyanine compound ("NK124" manufactured by HAYASHIBARA Biochemical Laboratories, Inc., the maximum absorption wavelength: 928 nm) and 0.4 weight parts of a cyanine compound ("IR-301" manufactured by Yamada Kagaku Co., Ltd., the maximum absorption wavelength: 830 nm).

Figure 10:
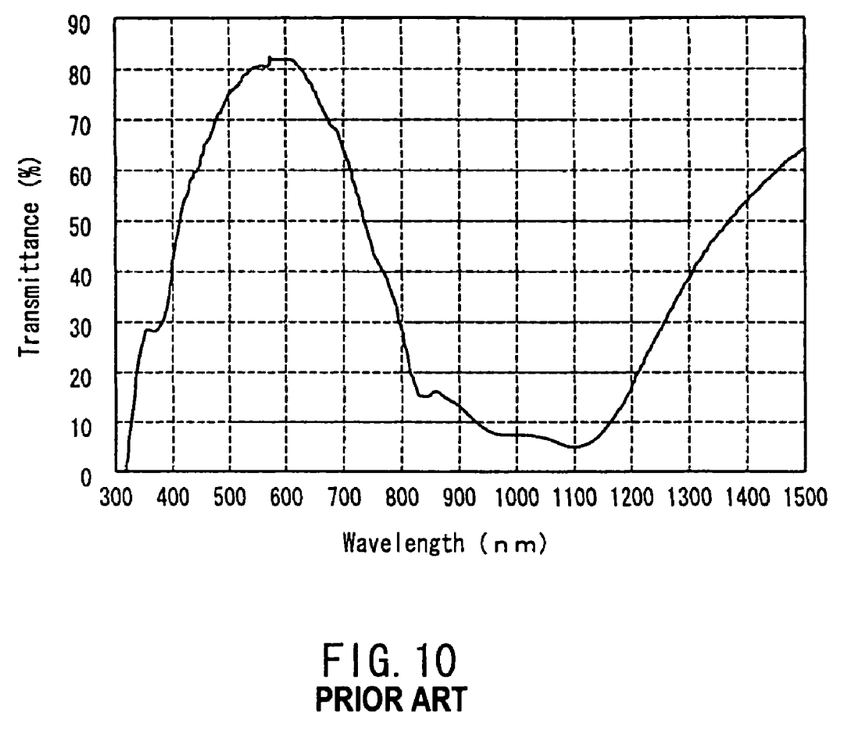
FIG. 10 is a graph showing a spectral transmittance of a near-infrared shield in Comparative Example 2 after a light resistance test.

In a measurement performed as in Example 1 for the near-infrared shield, the spectral transmittance in a wavelength region ranging from 820 nm to 950 nm was 15% or less, and the spectral transmittance in a wavelength region ranging from 950 nm to 1100 nm was 10% or less. The Haze value was 0.8%, and the chromaticity (x, y) was (0.3200, 0.3442). A light resistance test was performed as in Example 1. The spectral transmittance of the near-infrared shield after the light resistance test was measured as mentioned above. As shown in FIG. 10, the spectral transmittance in the wavelength region ranging from 820 nm to 830 nm exceeded 13%. The chromaticity changes (x, y) of the transmitted light were 0.007 for Δx and 0.009 for Δy.

As mentioned above, a near-infrared shield according to the present invention keeps an excellent near-infrared shielding property, and the near-infrared absorptivity does not deteriorate even after a light resistance test. By using the near-infrared shield of the present invention, a display front panel suitably used for an electronic display, particularly for a PDP, can be provided.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A near-infrared shield comprising a base and a near-infrared absorption layer disposed on one main surface of the base, wherein
   when irradiated from the near-infrared absorption layer side with a xenon light having a wavelength of 380 nm to 1200 nm at an illuminance of 60 W/m² and an energy density in a range of 300 nm to 400 nm for 16 hours under a condition of BPT of 63° C. and a relative humidity of 50%,
   chromaticity changes Δx, Δy of transmitted light before and after the irradiation, which are shown in a chromaticity diagram of a CIE1931XYZ color system, are not more than 0.005, respectively;
   wherein the near-infrared absorption layer is a single layer.

2. The near-infrared shield according to claim 1, wherein the near-infrared absorption layer comprises a diimonium compound comprising a sulfonic acid imide derivative anion as a counter-anion and a compound comprising a substituted benzenedithiol metal complex anion having a structure represented by a chemical formula (1) below and a cation having a structure represented by a chemical formula (2) below as counter ions:

(1)

in chemical formula (1), $R_1$ and $R_2$ each independently denote at least one substituent selected from the group consisting of an alkyl group having 1 to 6 carbon atoms, an alkylamino group having 1 to 8 carbon atoms, a substituted or unsubstituted morpholino group, a substituted or unsubstituted thiomorpholino group, a substituted or unsubstituted piperazino group and a substituted or unsubstituted phenyl group, and M denotes a transition metal;

in chemical formula (2), $Q_1$ and $Q_2$ each independently denote at least one heterocyclic compound selected from the group consisting of a five-membered nitrogen-containing heterocycle, a condensed ring comprising a five-membered nitrogen-containing heterocycle, a six-membered nitrogen-containing heterocycle and a condensed ring comprising a six-membered nitrogen-containing heterocycle, and $R_3$ and $R_4$ each independently denote an alkyl group having 1 to 8 carbon atoms, and n denotes a number of 2, 3 or 4.

3. The near-infrared shield according to claim 2, wherein at least one of the substituents bonded to the nitrogen atoms at the ends of cation sites of the diimonium compound is an alkyl group having a branched chain structure.

4. The near-infrared shield according to claim 2, wherein the near-infrared absorption layer comprises a resin for dispersing the diimonium compound and the compound comprising the counter ions.

5. The near-infrared shield according to claim 4, wherein the resin has a glass transition temperature of not lower than 80° C.

6. The near-infrared shield according to claim 2, wherein the near-infrared absorption layer comprises a compound having a maximum absorption wavelength in a wavelength region ranging from 580 nm to 620 nm.

7. The near-infrared shield according to claim 2, wherein the near-infrared absorption layer comprises a compound having a maximum absorption wavelength in a wavelength region ranging from 540 nm to 570 nm.

8. The near-infrared shield according to claim 2, wherein the near-infrared absorption layer comprises a compound having a maximum absorption wavelength in a wavelength region ranging from 480 nm to 500 nm.

9. The near-infrared shield according to claim 2, wherein the near-infrared absorption layer has a Haze value of not more than 1%.

10. The near-infrared shield according to claim 2, further comprising a hard-coat layer and an antireflection layer, where the hard-coat layer and the antireflection layer are disposed on a surface of the base opposite the main surface on which the near-infrared absorption layer is disposed.

* * * * *